Patented June 13, 1933

1,913,805

UNITED STATES PATENT OFFICE

HELMUTH HAUSEN, OF PULLACH NEAR MUNICH, GERMANY

PROCESS FOR SEPARATING GAS MIXTURES MORE PARTICULARLY COKE OVEN GAS

Application filed January 21, 1928, Serial No. 248,544, and in Germany January 24, 1927.

In separating gas mixtures by partial condensation at low temperature, it is important to utilize as fully as possible the heat of vaporization of the separated-out constituents for the cooling and condensation of equivalent parts of the fresh gas, as otherwise the cold required becomes too great, and therefore the consumption of energy too high.

The utilization of the heat of evaporation of the separated condensates is effected by withdrawing the condensates from the mixtures of gases from which they have been separated and bringing them into heat exchange with the incoming mixture of gases, at the heating surfaces of an evaporating vessel, that is to say, in a bath, and thereby evaporating them. The energy utilized in the evaporation is derived in this method solely from the condensation of the separable constituents of the mixture of gases.

The condensate which is being evaporated can only take up heat from the incoming gas as long as the incoming gas is at a higher temperature than the bath. Consequently, of a condensible component of the mixture of gases only that part will be condensed which is contained therein in excess of the saturation concentration at the temperature of the bath. If $p_a$ is the partial pressure of this component in the original gas, and $p_v$ the partial pressure in equilibrium with the condensates at the temperature of the bath, which pressure is equal to the evaporation pressure of said component in the bath, the quantity of the condensate and the heat absorbed by the liquid of the bath will be in proportion to the difference $p_a - p_v$.

If it is necessary to remove the condensible constituents to a greater degree, this must be effected by a special intensive cooling to the desired final partial pressure, which is lower than the pressure of evaporation of the liquid in the bath and may be called $p_e$, and then separating the condensates. The quantity of the condensate separated in this state corresponds to the partial pressure difference $p_v - p_e$ and is withdrawn from the separator by expanding it from the pressure of the liquid in the bath. Therefore, the evaporation of this condensate can only begin when the condensate has reached the temperature of the bath, that is to say, when its vapor pressure has become $p_v = 1$ atm. if the bath is at atmospheric pressure. In being heated to the temperature of the bath it is only able to absorb the small amount of heat which corresponds to the difference in its thermal content as a liquid at the separator and bath temperatures, respectively. Thus it is not possible to recover the main quantity of the units of cold supplied by the auxiliary cooling for condensation by passing the current of the condensate in the opposite direction to that of the unseparated mixture of gases. These condensates are therefore combined, immediately after their separation, with the main quantity of the condensates separated at the high temperature in the evaporating vessel.

These condensates therefore increase the quantity of the bath liquid by the amount proportional to the value $p_v - p_e$. The total cold available in the bath is then proportional to the difference of the partial pressures $p_a - p_v + p_v - p_e = p_a - p_e$ while, as before stated, that which can be used out of the bath by evaporation is only proportional to $p_a - p_v$. The fraction of the utilizable heat of evaporation will consequently be $$x = \frac{p_a - p_v}{p_a - p_e}$$

Thus, the liquid in the bath can never be evaporated completely by the incoming unseparated mixture of gases. The result is a large requirement of energy for the production of cold as it is the cold which is utilized in cooling to a low temperature and which cannot be recovered which is especially expensive. It is known that the withdrawal of a unit of heat requires an amount of energy which is the greater the lower the temperature which is produced.

The present invention is directed to overcoming this difficulty, in that the excess of the bath liquid is evaporated by an auxiliary gas under pressure, for example, nitrogen which is under a medium pressure and which flows through a heating coil in the bath. This auxiliary gas thus gives off heat and is liquefied. After further counter flow cooling, by which this liquid is eventually cooled below the saturation temperature of the constituents to be removed from the gas mixture, it is relieved of pressure and then forms the cooling bath for the final cooling of the mixtures of gases before referred to, and, on the principle of the operation of a refrigerating machine, is capable of again absorbing at its lower temperature the heat given up at a higher temperature. The liquefied auxiliary gas serves for condensing the same constituents which it has evaporated as a gas of medium pressure.

The process of separating coke-oven gas is hereinafter described, by way of example, with reference to the accompanying drawings.

Figure 1:
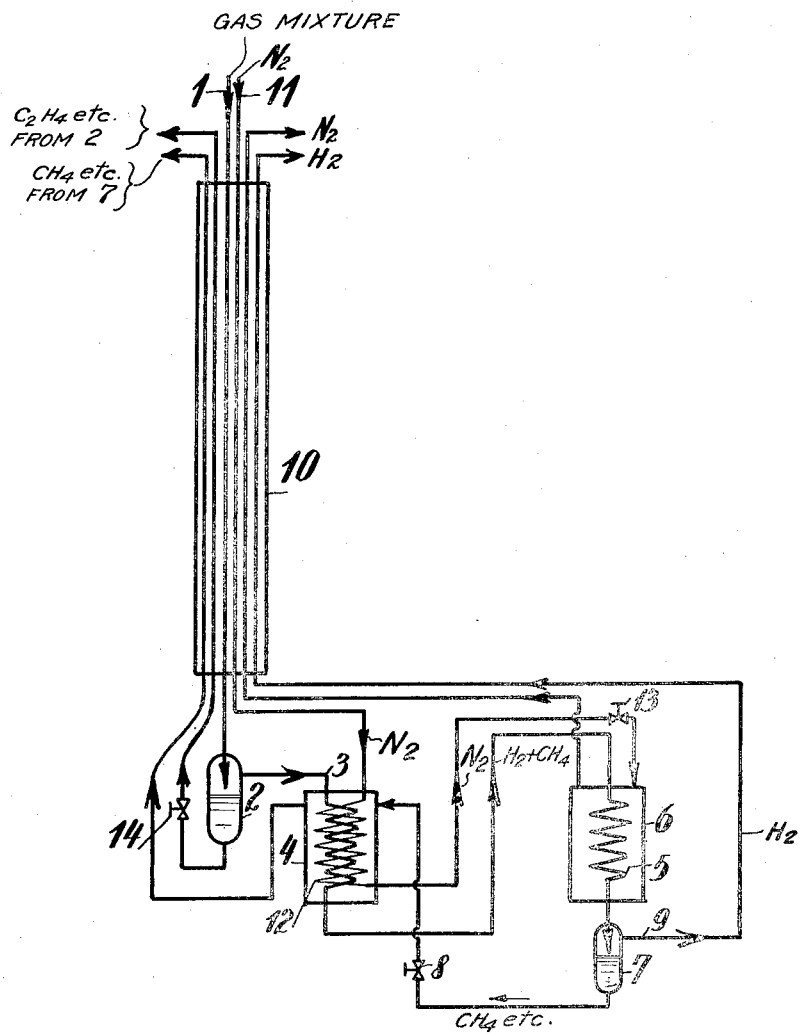
Fig. 1 is a diagrammatic representation of an apparatus for the separation of substantially pure hydrogen from coke-oven gas with the aid of nitrogen as a carrier of cold.

In the drawings, 10, 15 and 21 are countercurrent heat exchangers; 2, 7 and 7a are separators for the separation of liquid condensate from the uncondensed gases; 4 and 6 are vaporizing vessels; 16 is a washing column; 3, 5, 12 and 19 are cooling coils; and 8, 8a, 13, 14, 17, 18, 23, and 26 are valves.

In the process illustrated more particularly in Fig. 1, the coke-oven gas, which has been compressed to, for example, 10 atmospheres, and from which carbonic acid, sulphide of hydrogen, and water-vapour have been removed, is passed at 1 into the counter-current heat exchanger 10 and is there cooled by the gases flowing in the opposite direction to a temperature, which is so high, however, that no large quantities of methane condense out of the coke-oven gas, apart from the comparatively small quantities which are dissolved in the higher boiling point constituents, ethylene, ethane etc. The actual condensation of the methane than commences in the cooling coil 3 disposed in the vessel 4, and is completed in the coil 5 of the vessel 6, in which an additional cooling medium at low temperature is provided (for instance, nitrogen which boils under atmospheric pressure). As hereinbefore explained, only a fraction (in the most favourable circumstances 60%), of the liquefied methane, which expands and leaves the separator 7 through the valve 8, can be vaporized in the vessel 4. In order to render possible complete vaporization of the methane, compressed gaseous nitrogen is introduced at 11, pre-cooled by the counter-current heat exchanger 10, and liquefied in the coil 12. The pressure to which this nitrogen is subjected must accordingly rise above the liquefying pressure at the temperature of the boiling methane (in the example 16 atmospheres). The quantity of nitrogen is such that the total excess of liquid methane is vaporized. The liquefied nitrogen is expanded to atmospheric pressure through the valve 13, and the coke-oven gas may then be cooled, as hereinbefore described, in the vessel 6 to produce the complete condensation of the methane and of the main quantities of CO, so that a gas which is rich in hydrogen and does not contain methane passes out at 9; this gas, together with the methane and all the other products of separation passes through the counter-current heat exchanger 10, cooling the freshly entering gas. The pressure of the hydrogen which passes out is practically equal to that of the coke-oven gas which enters.

Figure 2:
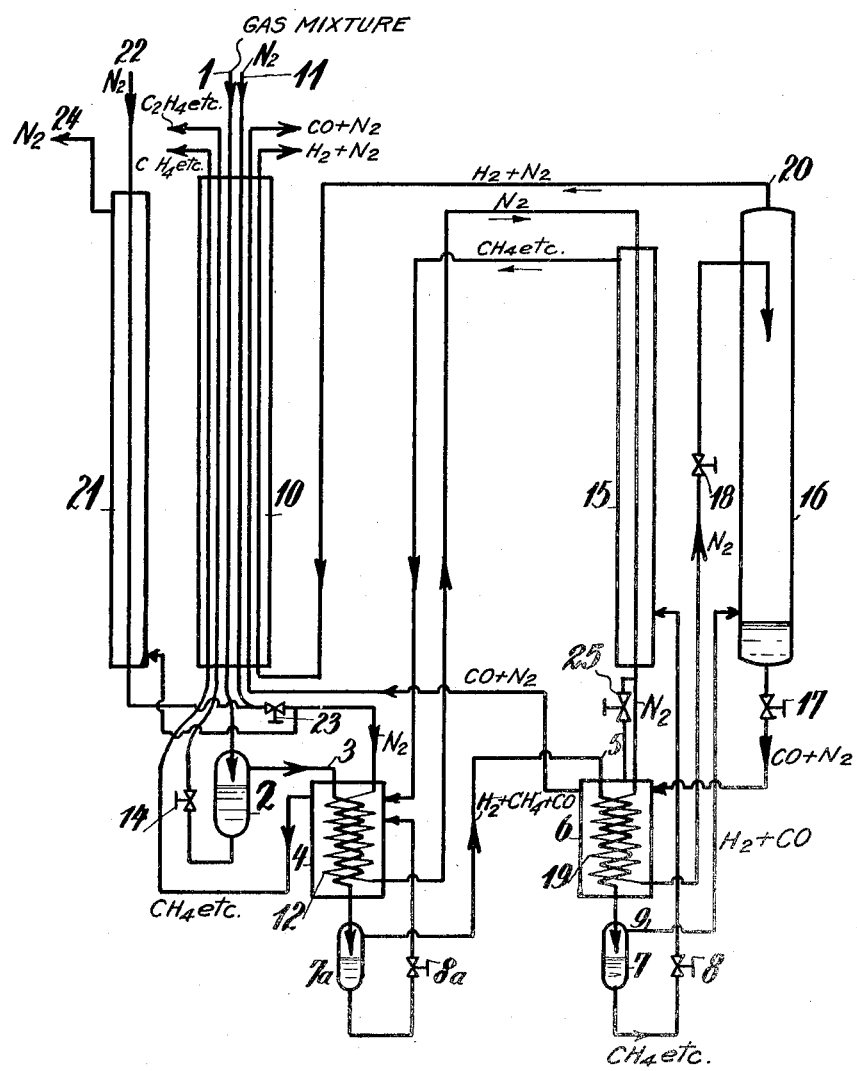
Fig. 2 is a diagrammatic representation of an apparatus suitable for the production of a carbon monoxide-free nitrogen-hydrogen mixture by the process of the invention, wherein a high-pressure nitrogen cycle is used to compensate for cold losses and a rectifying column is provided for washing the gases.

If a mixture of hydrogen and nitrogen is to be separated out from the coke-oven gas, and not only methane but also carbon monoxide are to be almost wholly removed, according to a process which is employed on a large scale for the purpose of producing synthetic ammonia, the hydrogen which leaves the separator 9 is submitted to a further purification process, for which purpose washing with liquid nitrogen at a low temperature has been found to be particularly effective. The process of the present invention can be combined very simply and advantageously with the method of washing, whereby the same nitrogen employed for intensifying the cold of the liquefied constituents to a lower temperature, is utilized for washing and purifying the gas. For this purpose, after the preliminary treatment hereinbefore described, that is to say, after the condensation of the methane etc. the coke-oven gas is led from the separator at 9 into the bottom of a column, where it is washed with liquid nitrogen to remove the residues of carbon monoxide and methane whereupon it is returned from the head of the column through the counter-current heat exchanger 10. The nitrogen which has been liquefied in the coil 12, having expanded to the pressure in the column, is now fed into the column instead of entering directly into the vessel 6, and the liquid which is withdrawn at the lower end of the column and which contains some carbon monoxide, is fed into the vessel 6. This method is illustrated in Figure 2 of the drawings, which shows a number of further modifications. In this Figure 2, a separator 7a is provided from which the liquid condensed in the methane vessel 4, is allowed to expand through the valve 8a and to return directly into this vessel. Furthermore, a counter-current heat exchanger 15 is provided, in which the liquid from the separator 7 is employed for further cooling the nitrogen condensed in the coil 12. By this arrangement it is possible to utilize at a low temperature, a part of the cold of the liquid separated out at low temperature. The liquid nitrogen is furthermore cooled, in a coil disposed in the nitrogen vessel 6, to the boiling temperature of this impure nitrogen, and the coke-oven gas which flows through the coil 5 is cooled to the same temperature. By regulating the pressure and temperature in the vessel 6, the composition of the hydrogen mixture which is discharged from the washing column 16, at the top at 20 is controlled in a simple manner; the partial pressure of the hydrogen remains practically unchanged during the passage of the gas through the washing column, for which the preliminary cooling of the washing nitrogen is important. By employing the nitrogen under a fairly high pressure the methane is effectively vaporized in the vessel 4, and the liquid nitrogen cooled in the vessel 6 considerably below its saturation pressure.

An additional cooling effect may be obtained in vessel 6 by expanding a portion of the liquid nitrogen coming from the heat exchanger 15 directly into vessel 6 through valve 25.

For carrying out the process of the application it is necessary to employ a not inconsiderable addition of cold, in view of the relatively large dimensions of the cold parts and the practical incompleteness of the heat exchange. For the production of this cold the present invention offers a particularly advantageous combination with the high pressure circulating process described in the specification of the British Patent No. 12,528/95, using nitrogen as the circulating gas, and using part of the same nitrogen for carrying out the refrigerating process and the washing. The nitrogen is thus highly compressed and after passing through a counter-current heat exchanger is throttled down to a medium pressure producing a refrigerating effect in known manner. The greater part of the nitrogen returns to the compressor under the medium pressure, the other part is employed for carrying out the refrigerating process and the washing operation hereinbefore described and is afterwards expanded to atmospheric pressure. A counter-current heat exchanger 21 for the compressed nitrogen, which enters at 22, is provided for carrying out this operation, the highly compressed nitrogen being allowed to expand through the valve 23 to a medium pressure, which may lie between 20 and 60 atmospheres. The greater part of the nitrogen under medium pressure returns to the compressor through the heat exchanger 21 at 24, while the remainder is passed into the coil 12, instead of the nitrogen which in the apparatus hereinbefore described passes through the counter-current heat exchanger 10.

As, in the apparatus last described, the quantity of gas which passes out through the counter-current heat exchanger 10 is greater than the quantity of compressed gas that enters, by the amount of nitrogen vaporized in the washing column, the compressed gas cannot absorb all the cold of the remaining gas that passes out. To compensate for this fact, a part of the compressed nitrogen is allowed to pass through the tube 11 of the counter-current heat exchanger 10. It will be understood that the same purpose can be attained by allowing a corresponding quantity of the products of decomposition of the coke-oven gas to pass out through the heat exchanger 21. These quantities are controlled in every case in such a way that the differences of temperature of the inflowing and issuing gases are reduced to a minimum in the counter-current heat exchangers 10 and 21.

In the foregoing the separation of the coke-oven gas is dealt with merely as an example. The process can be applied in a similar manner to any desired gas mixtures having constituents with different boiling points; instead of nitrogen a gas may be employed the boiling point of which is lower than that of the separated out constituents, and the presence of which is permissible in the separation products to be extracted.

I claim:

1. In a process for the separation of gas mixtures, such as coke-oven gas, containing constituents of different boiling points, by partial condensation, the method of utilizing the cold contained in the constituents condensed at relatively low temperatures but vaporized at higher temperatures, which comprises absorbing cold from said condensed constituents by indirect heat exchange with a low-boiling auxiliary gas under superatmospheric pressure, whereby the auxiliary gas is at least partially condensed and eventually cooled below its condensation temperature, expanding the condensed auxiliary gas to a lower pressure and bringing it into indirect heat exchange relation with the gas mixture in the last indirect cooling stage thereof, the condensed auxiliary gas, before being expanded to said lower pressure, being used for washing out the impurities contained in the gas mixture after the last indirect cooling stage, by direct contact therewith.

2. In a process for the separation of gas mixtures, such as coke-oven gas, containing constituents of different boiling points, by partial condensation, the method of utilizing the cold contained in the constituents condensed at relatively low temperatures but vaporized at higher temperatures, which comprises absorbing cold from said condensed constituents by indirect heat exchange with a low-boiling auxiliary gas under superatmospheric pressure, whereby the auxiliary gas is at least partially condensed and eventually cooled below its condensation temperature, expanding the condensed auxiliary gas to a lower pressure and bringing it into indirect heat exchange relation with the gas mixture in the last indirect cooling stage thereof, a part of the condensed auxiliary gas, before being expanded to said lower pressure, being used for washing out the impurities contained in the gas mixture after the last indirect cooling stage, by direct contact therewith.

3. In a process for the separation of gas mixtures, such as coke-oven gas, containing constituents of different boiling points, by partial condensation, the method of utilizing the cold contained in the constituents condensed at relatively low temperatures but vaporized at higher temperatures, which comprises at least partially condensing a low-boiling auxiliary gas under superatmospheric pressure by the evaporation of the higher boiling condensates by indirect heat exchange therewith, thereafter cooling the liquefied auxiliary gas below its condensation temperature by evaporation of the lower boiling condensates by indirect heat exchange therewith, expanding the condensed auxiliary gas to a lower pressure and bringing it into indirect heat exchange relation with the gas mixture in the last indirect cooling stage thereof, the condensed auxiliary gas, before being expanded to said lower pressure, being used for washing out the impurities contained in the gas mixture after the last indirect cooling stage, by direct contact therewith.

4. In a process for the separation of gas mixtures, such as coke-oven gas, containing constituents of different boiling points, by partial condensation, the method of utilizing the cold contained in the constituents condensed at relatively low temperatures but vaporized at higher temperatures, which comprises at least partially condensing a low-boiling auxiliary gas under superatmospheric pressure by the evaporation of the higher boiling condensates by indirect heat exchange therewith, thereafter cooling the liquefied auxiliary gas below its condensation temperature by evaporation of the lower boiling condensates by indirect heat exchange therewith, expanding a portion of the condensed auxiliary gas to a lower pressure and bringing it into indirect heat exchange relation with the gas mixture in the last indirect cooling stage thereof, the remaining portion of the condensed auxiliary gas, before being expanded to said lower pressure, being used for washing out the impurities contained in the gas mixture after the last indirect cooling stage, by direct contact therewith.

5. In a process for the separation of gas mixtures, such as coke-oven gas, containing constitutents of different boiling points, by partial condensation, the method of utilizing the cold contained in the constituents condensed at relatively low temperatures but vaporized at higher temperatures, which comprises absorbing cold from said condensed constituents by indirect heat exchange with nitrogen under superatmospheric pressure, whereby the nitrogen is at least partially condensed and eventually cooled below its condensation temperature, expanding the condensed nitrogen to a lower pressure and bringing it into indirect heat exchange relation with the gas mixture in the last indirect cooling stage thereof, the condensed nitrogen, before being expanded to said lower pressure, being used for washing out the impurities contained in the gas mixture after the last indirect cooling stage, by direct contact therewith, the nitrogen being preliminarily cooled by expansion from a high initial pressure to a medium superpressure, a portion of the expanded nitrogen being immediately returned to the compressor in countercurrent heat exchange with the supply of nitrogen under high pressure.

6. In a process for the separation of gas mixtures containing hydrogen, such as coke oven gas, by partial condensation, the method of utilizing the cold contained in the constituents condensed under low partial pressure and at corresponding low temperatures, but revaporized under higher pressure and at corresponding higher temperatures, which comprises condensing certain of the constituents in indirect heat exchange with a liquefied auxiliary gas of lower boiling point whereby the liquefied auxiliary gas is evaporated and condensing the auxiliary gas under superatmospheric pressure in indirect heat exchange with the said liquefied constituents, whereby said constituents are simultaneously evaporated.

7. In the process defined in claim 6, bringing the liquefied auxiliary gas into counter current heat exchange with the condensed constituents, whereby the liquefied auxiliary gas is precooled before it is utilized for the condensation of said constituents.

HELMUTH HAUSEN.